United States Patent [19]
MeLampy et al.

[11] Patent Number: 5,862,208
[45] Date of Patent: Jan. 19, 1999

[54] METHOD AND SYSTEM FOR ENABLING A PARTY TO CHANGE TERMINALS DURING A CALL

[75] Inventors: Patrick J. MeLampy, Beverly; Andrew D. Ory, Somerville, both of Mass.

[73] Assignee: Priority Call Management, Inc., Wilmington, Mass.

[21] Appl. No.: 462,294

[22] Filed: Jun. 5, 1995

Related U.S. Application Data

[62] Division of Ser. No. 198,032, Feb. 16, 1994, abandoned.

[51] Int. Cl.[6] ............................................. H04M 3/42
[52] U.S. Cl. ..................... 379/212; 379/215; 379/224; 379/229; 455/436
[58] Field of Search .................................. 379/201, 207, 379/215, 219, 220, 229, 230, 245, 246, 127, 142, 60, 59, 88, 213, 265, 211, 154, 89, 67, 212; 455/414, 417, 458, 459, 31.3, 224, 436

[56] References Cited

U.S. PATENT DOCUMENTS

| | | |
|---|---|---|
| 3,704,346 | 11/1972 | Smith et al. . |
| 4,086,438 | 4/1978 | Kahn et al. . |
| 4,658,416 | 4/1987 | Tanaka . |
| 4,661,972 | 4/1987 | Kai . |
| 4,685,127 | 8/1987 | Miller et al. ............................ 379/221 |
| 4,747,124 | 5/1988 | Ladd . |
| 4,757,526 | 7/1988 | Foster et al. ............................. 379/201 |
| 4,783,796 | 11/1988 | Ladd ........................................ 379/67 |
| 4,887,265 | 12/1989 | Felix ........................................ 379/59 |
| 4,926,462 | 5/1990 | Ladd et al. .................................. 379/67 |
| 4,935,956 | 6/1990 | Hellwarth et al. ...................... 379/112 |
| 4,972,464 | 11/1990 | Webb et al. ............................. 379/112 |
| 5,090,050 | 2/1992 | Heffernan ................................. 379/60 |
| 5,113,430 | 5/1992 | Richardson, Jr. et al. ............... 379/88 |
| 5,199,062 | 3/1993 | Von Meister et al. .................... 379/67 |
| 5,235,630 | 8/1993 | Moody et al. ............................ 379/37 |
| 5,311,570 | 5/1994 | Grimes et al. . |
| 5,315,636 | 5/1994 | Patel . |
| 5,327,486 | 7/1994 | Wolff et al. ............................. 379/142 |
| 5,329,578 | 7/1994 | Brennan et al. .......................... 379/89 |
| 5,335,266 | 8/1994 | Richardson, Jr. et al. ............... 379/67 |
| 5,353,331 | 10/1994 | Emery et al. ............................. 379/67 |
| 5,375,161 | 12/1994 | Fuller et al. ............................. 379/212 |
| 5,440,563 | 8/1995 | Isidoro et al. ........................... 379/219 |

*Primary Examiner*—Ahmad F. Matar
*Assistant Examiner*—Scott Wolinsky
*Attorney, Agent, or Firm*—Crosby, Heafey, Roach & May

[57] ABSTRACT

A system and method for remote call control, including providing a tandem switch to control independent legs of a telephone conversation. The switch connects an organization's telecommunications system (Centrex or PBX), with cellular or wireless telephones. The switch facilitates a call coverage plan for an organization, and provides the ability to selectively seize and dial a plurality of telephone terminals as needed in a manner based at least in part upon instructions received from a remote or wireless terminal.

20 Claims, 7 Drawing Sheets

METHOD AND SYSTEM FOR ENABLING A PARTY TO CHANGE TERMINALS DURING A CALL

This is a divisional of application Ser. No. 08/198,032, filed Feb. 16, 1994, now abandoned.

FIELD OF THE INVENTION

The present invention relates in general to telecommunications equipment and, more particularly, relates to methods and apparatus for interfacing wireless telecommunications terminals into an existing telecommunications network.

BACKGROUND OF THE INVENTION

The telecommunications industry is currently undergoing a massive shift from wired telecommunications devices to wireless devices. The impetus for this transition is mobility, and reduced cost for system reconfiguration. The invention described herein fits the form and function of a "Personal Communications Services" as described in industry terms.

Cellular and other wireless telephones offer mobility, but at the expense of reliability and interoperability. Additionally, wireless handsets provide unlimited access to the carrier of the telephone and lacks a mechanism for incorporating standard call coverage tools which are provided by the land-based telecommunications systems (PBX or Centrex).

Unreliable Connections

Cellular and wireless handsets often lose connection. This is due to many technical reasons, including improper hand-off between cells, signals below minimum thresholds, loss of battery power, etc. Typically, upon a lost connection, the caller and wireless user must re-establish communication manually.

Limited Access Screen

Most business telephone extensions are part of the organization's coverage plan. This coverage plan may include, but is not limited to, live operator support, secretary or co-worker coverage, voicemail, etc. Most business phones have buttons for "Do Not Disturb", and many have display screens to identify the (internal) calling party's number and name, if available. Many executives have all arriving calls screened by their secretary, limiting direct access to the executive only for important calls.

The rapid growth in wireless device availability complicates the picture. Cellular telephones are not integrated with any organization's telephone system, as the service is only sold and operated from off-premise locations reached via Central Office connections. A few other wireless devices have recently been made available to the Customer Premise Equipment marketplace to provide on-premise, wireless handset capability. These newer devices provide only simple analog interfaces, with a limited set of capabilities. Some manufacturers offer different levels of integration, but none provide direct determination of unknown callers and the ability to "act on" the calls.

The lack of integration of wired and wireless telephones means that, for a cellular or cordless user:

No information about who is calling is transmitted to the handset.

There is no ability to screen the caller without answering.

Some wireless devices may be incapable of the "transfer" feature to move the call to another terminal.

Some wireless devices may not be capable of forwarding from the handset to another dialed number.

Calls can't be forwarded or transferred from the on-premise networks to an off-premise wireless devices phone.

The next generation devices, now just reaching the market, include "wireless Centrex" offerings which use SS7 Common Channel Signaling protocols to integrate Centrex telephones into a Centrex partition. These services are not commonly available due to the slow deployment of the SS7 overlay signalling network into central offices.

Handoff/Transfer Between Cellular and Wired Telephones is Impossible

When a call arrives on a wireless device, the user of the device has the mobility to move from place to place. However, because wireless devices are not "secure", and the quality of the voice may be less than that of a wired telephone, it may be desirable to switch the call to the nearest wired telephone, but only without losing connection. This has the added effect of saving money since many wireless service providers charge for all air time.

The current art supports automatic handoff between different wireless systems which are homogeneous and support the cellular telephone protocol IS-41 ("roaming"). Unfortunately, handoffs to wired or dissimilar wireless networks were impossible until the development of the current apparatus.

SUMMARY OF THE INVENTION

This invention uses a tandem switch to provide a "bridge" between two callers. In a preferred embodiment, the switch connects an organization's telecommunications system (Centrex or PBX) and the cellular or wireless telephones. The switch facilitates a call coverage plan for an organization and provides the ability to seize and dial a plurality of wireless networks as needed. An arriving call never totally leaves the fabric of the organization's telecommunications system, providing access to all telecommunications coverage options including transferring to additional parties, voicemail, etc.

Calls arriving or leaving an organization's telecommunications system which connect to any wireless device can be routed to the PCS system described herein. When routed to and/or through the PCS system, control of the call is obtained. This control includes the ability to treat each leg of the call as independent. The control of the call is used to implement the features described below.

The methods of interconnecting to the on-premise telecommunications equipment vary depending on the age and technical features of the equipment utilized. In a basic, preferred embodiment, the PCS actually holds both legs of the telephone calls across its call switching mechanism. The PCS will then have separate control over both legs, including the ability to detect near-end or far-end call release, rerouting of calls, preemptive call interruption, call conferencing, and call joining.

In a more advanced embodiment, the call control is obtained and trunk and route optimization is performed using the Advanced Intelligent Network architecture described in the CCITT Recommendations and Bellcore documents listed below:

CCITT Q.700: Introduction to CCITT SS7

CCITT Q.775: Guidelines for Using Transaction Capabilities

CCITT Q.724: Signaling Procedures

CCITT Q.761: Functional Description of the ISDN User Part of SS7

TR-NWT-000246 Issue 2, Revision 2: Bell Communications Research Specification of Signaling System Number 7

SR-NPL-001509 Issue 1: Advanced Intelligent Network Release 1 Proposal

SR-NPL-001623 Issue 1: Advance Intelligent Network Release 1 Network and Operations Plan The control of the call is retained through the use of "triggers," which are set for both arriving calls and calls in progress. The "triggers" fire when certain events occur and control of the call is returned to the PCS system.

CellGuard

This invention provides a connection safeguard by waiting for a disconnect to occur on either the caller side and/or the wireless user's side. If the wireless user disconnects first, then this trigger event will return control of the remaining caller to a voice processing system. The voice processing system will optionally prompt the caller to indicate whether reconnection is desired. If so, the voice processing system will re-initiate the call to the wireless device and/or wait for the caller to call back.

If the call originated on a wireless device and the wireless device disconnects, then the remaining caller is prompted to see if reconnection is desired. If so, the caller is placed on hold, waiting for the wireless device to call back. Optionally, an alert is transmitted which could be a page message or cellular data message sent to the wireless user to notify the user of the disconnected caller waiting for reconnection.

If the wireless device address (location and/or dialed number) is not known then the caller can be placed on hold to await the wireless handset's reconnection attempt. This permits the invention to operate correctly on all wireless devices, including those which have no common signaling with the PCS.

The present invention will be called "CellGuard" throughout the following document. This invention is not limited to cellular or wireless telephones and will provide the same functionality on all types of telecommunications equipment. Additionally, the features can be provided using different technologies. Illustrative methods of embodying this invention are described herein.

CellScreen

The objective of the present invention is to provide call screening through multiple means so that the wireless user can determine who is calling, the nature of the call, etc., before speaking to the caller. The unwanted screened call can be rerouted, placed into a call coverage option (including voicemail), terminated, or handled any way desired by the on-premise telecommunications system and selected by the user. Throughout this document, the term "CellScreen" will be used to describe this embodiment.

CellSaver

The hand-off from wireless to wired and vice versa can be performed using the present invention. This hand-off can occur once, or several times during the course of a single connection. The hand-off is completed by having a new call "steal" the call away from the conversation in progress. This provides the mechanism for unlimited hand-offs between dissimilar networks.

DESCRIPTION OF THE PREFERRED EMBODIMENTS

The basic device used for implementing the present invention is a tandem switch. This tandem switch allows connection between one of a variety of lines on one side of the switch and one of a variety of lines on the other side of the switch. By controlling which lines are connected and what lines are held, plus controlling how either line connects with other office services, the tandem switch can provide a wide variety of useful functions that are not currently available.

Figure 1:
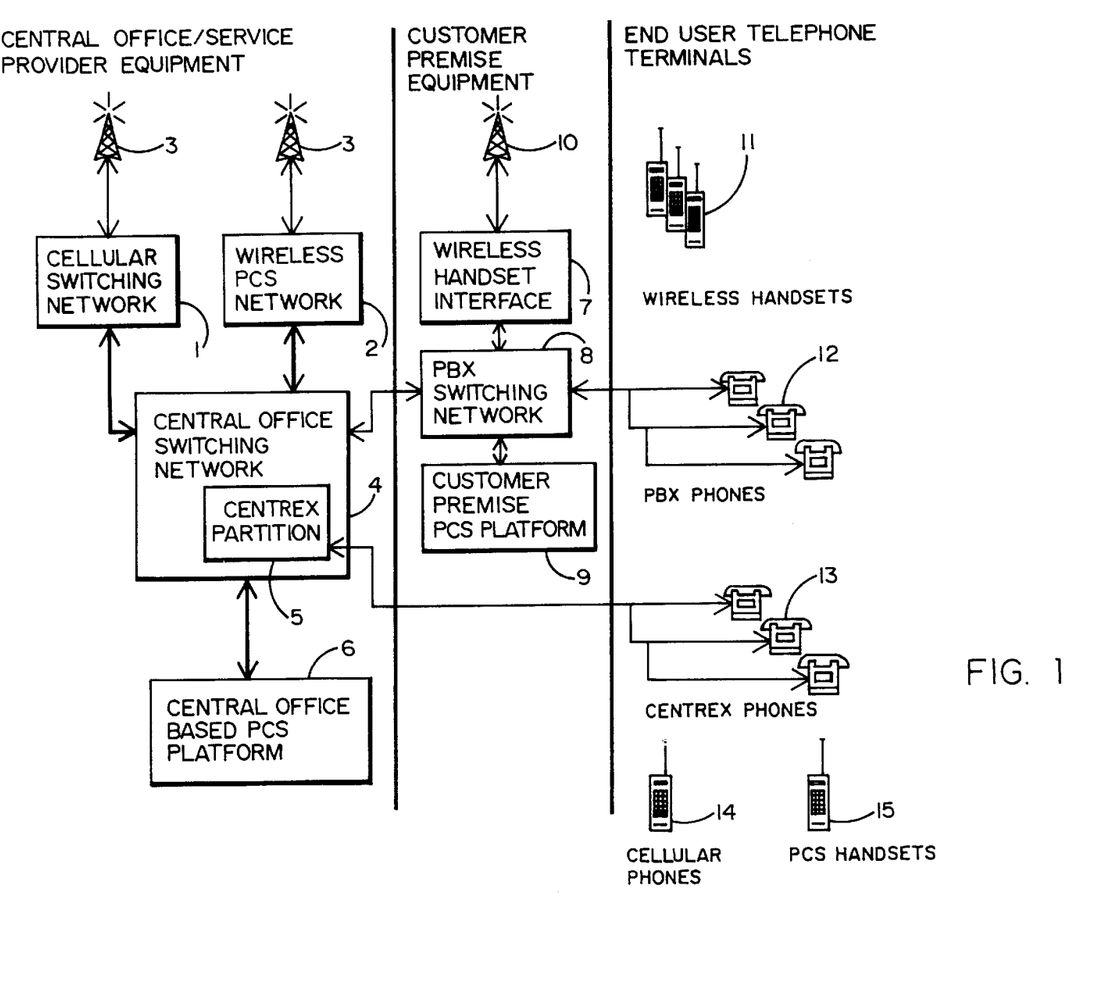
FIG. 1 illustrates a functional block diagram of the claimed system.

Referring to FIG. 1, this diagram shows the identity and connectivity of various functional units. Each block describes a functional unit. Cellular switching network 1 is accessible by dialing standard telephone numbers. These numbers are generally "off-premise" in relation to the organization's switching system 8 and 5. Central office switching network 4 provides local loop service connecting an organization's switching system 8 to the cellular switching network 1. Wireless PCS Networks 2 may also be accessible through central office switching network 4. Networks of antennae 3 exist for both cellular and wireless networks, providing radio frequency communications with the cellular phones 14 and personal communications handsets 15. On-premise wireless handsets are supported through a wireless handset interface 7 which connects directly to the PBX Switching network 8. Wireless handset interface 7 communicates via antennae 10 with handsets 11 on the customer premise. Standard analog telephones and digital feature phones 12 are connected directly to the on-premise PBX switching network 8. For organizations with Centrex service, the analog telephones and digital feature phones 13 are connected directly to central office switching network 4.

The PCS platform, which performs the functionality described in the present invention, is located in either the central office 6 or on-premise 9. The PCS connects only to the switching system utilized in performing the service.

Prior State of Art

Calls which arrive at the PBX 8 or Centrex partition 5 are routed to the correct directly-connected terminal. The coverage plan for the call is programmable, and the call may forward to additional telephone terminals 12, voicemail, or a receptionist.

The generally accepted practice is for organizations to prohibit off-premise forwarding and transferring due to potential toll-fraud abuses. Thus it would be invalid and not permitted to forward a PBX phone 12 to a Cellular phone 14. Another problem with off-premise forwarding and transferring is that the control of the call is lost. Thus no further forwarding/transferring is allowed. Upon hangup of either side, the call is terminated.

Typically, users of wireless services, such as Cellular Telephone service, have a separate telephone number for their "Cell Phone". Callers must typically hangup a call to an office number and dial the cellular telephone to gain access to the mobile person. Thus, many mobile professionals have multiple telephone numbers, the office number, the cell number and their home number. Cell phones also supply out of service coverage, either in the form of an announcement, or a voicemail service. Many cellular users today must check their voicemail box at work, their voicemail box at the cellular provider and their home answering machine to stay in full communication. It is the objective of the present invention to seamlessly integrate the cellular phones into an organization's on-premise telecommunications system, including call coverage mechanisms such as personal operators, receptionists, and voicemail.

Wireless PCS networks have been announced and will provide similar services as the cellular networks. These networks suffer from the same problems as the cellular telephones.

The wireless telephones are also unreliable in comparison to wired telephones. Disconnections are common and occur without warning. It is another objective of the present invention to detect unwanted disconnections, and to attempt to re-establish communications.

Wireless telephones are relatively expensive to use compared to wired telephones. It is also an objective of the present invention to move calls from wireless to wired, and vice versa, on command and at any time during a call.

Cell Guard

The PCS 6, 9 is the mechanism through which the present invention is embodied. The PCS platform is described in U.S. Pat. No. 5,140,626, issued to Ory et al. on Aug. 18, 1992 with some additional hardware components. The block diagram of the PCS is shown in FIG. 2.

Figure 2:
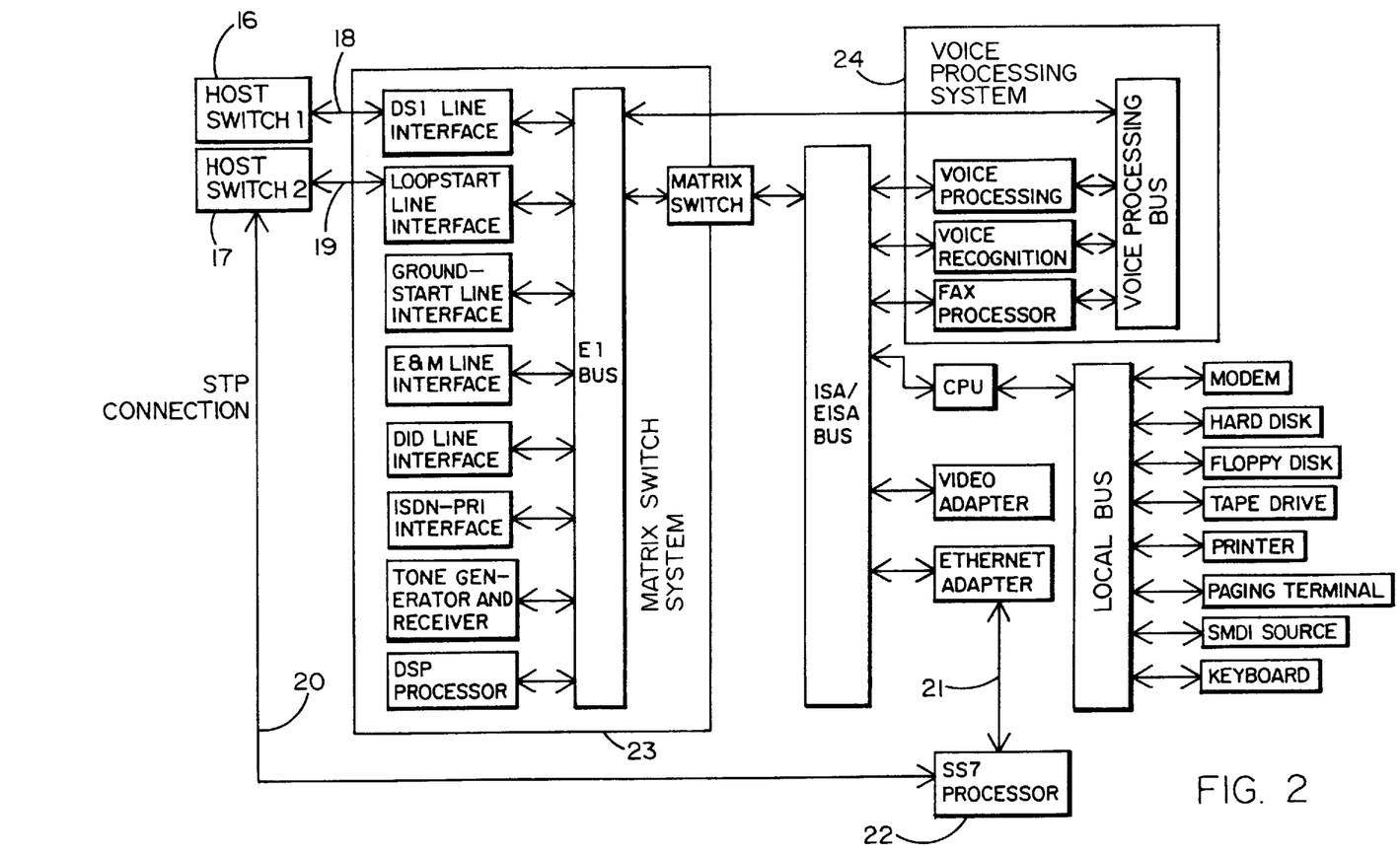
FIG. 2 illustrates a detailed block diagram of the PCS system.

Referring to FIG. 2, the block diagram shows the contents of the PCS system. All of the components are accepted as prior art and are available commercially. The tandem matrix switch, voice processing components and/or an SS7 interface are the mechanisms through which the desired call control is obtained. Host switch 16 and host switch 17 show the external switching platforms. The SS7 processor 22 is a separate computer purchased on the open market which has a TCP/IP interface 21, and is connected to a signal transfer point 20 on the SS7 network.

The present invention connects into the organization's switching system. The method of interconnection 18 and 19 can be through digital feature phone interface, ISDN basic rate, SS7 common channel signalling and standard telephone interfaces, feature group "D", SMDI (SMSI) accompanied with standard lines, or any combination of the above. The method of interconnection is prior art. The interface must provide a means of determining the called party, and, optionally the calling party. Furthermore, the embodiment of the present invention depends on the types of call controls available with each interconnection method.

Callers typically dial the business telephone number of their desired party. The organization may provide direct inward dial, permitting callers to directly ring their party's desk telephone. Other organizations provide a receptionist, human or automated to route callers to their destinations. Either way, the desktop telephone will ring. After the desired number of rings, the call will forward, using conventional means to PCS 9. Upon arrival, information about the called party and the calling party is obtained using common methods, such as SMDI, ISDN, Feature Phone Emulation, SS7, etc (all prior art). If the called party, otherwise known as the subscriber, has registered a cellular telephone with the PCS, the caller will be prompted to hold while the call is routed and the cellular telephone will begin ringing. Once the cellular telephone begins ringing it can be answered directly by the subscriber.

Another embodiment of the present invention would permit the subscriber, through a voice processing means accessible by any touch tone phone, to become unavailable for cellular calls. This may be desired for periods of time during the day. This time of day control provides the highest level of screening.

A further level of screening can be obtained by using an in-band or out-of-band data message sent over a wireless transmission network. This could include standard pagers utilized today or CDMA cellular data transport methods being deployed. The message would arrive at the display terminal (pager, etc) providing information from the telephone network about who's calling.

A further level of screening can be obtained using voice processing means to prompt the caller for their number. This data can be sent to the wireless data link described above.

A further level of screening can be obtained by using the following routine. The cellular user will be called. When the system answers, the user is prompted by an announcement of any required digits followed by a menu of options, one of which is accepting the call.

A further level of screening can be obtained by using voice processing means to prompt the caller to speak his name. This method is obvious to anyone skilled in the art. The distinction here is to use the name recording to identify calling parties to off-premise cellular users. The cellular user will be called. Upon answer, the name will be played followed by a menu of options, one of which is accepting the call.

A further level of screening can be obtained by listening in to voicemail messages being left in real time. The system allows monitoring in synchronous or asynchronous modes, that is, by listening to the message in real time as the speaker is leaving a message (synchronous) or by playing the message from the beginning, even though the speaker continues to speak (asynchronous). The cellular user can listen to messages, being left, and then decide to connect to the caller by pressing a DTMF key.

When screening a call using these methods, the cellular user may act on the call by making selecting from the menu. Using the menu, the cellular user may re-route the caller to another on-premise extension, re-route the caller to an off-premise telephone number, re-route the caller to voicemail, re-route the caller to a receptionist, or hangup on the caller.

Once a call has been accepted by the cellular user, the system will now monitor both sides of the call for hangup. This may be through directly carrying the talk-path utilized in the conversations or through the use of "triggers" established for hangup events. Should the cellular user desire it, the CellGuard device may be used to monitor over the cellular user's or subscriber's side of the call. Should the cell phone disconnect before the caller disconnects, the caller will be played a short menu. The menu will say "Your connection has been dropped. To re-establish your connection, press 1". If the caller presses a key, or signals a desire to reconnect through any other voice processing means available to one skilled in the art (such as voice recognition), the PCS will call the cellular phone and attempt reconnection. Alternatively, the system can be automated to automatically put the connected caller on hold, with a brief message such as "Signal lost. Please hold while we reestablish a connection." Whichever method is used, should reconnection not be an option, the caller may leave a message in the on-premise voicemail system.

Cellular users may not want callers to reconnect. To hangup on a caller, the cellular user can press either a sequence of DTMF digits, such as pound, or hold down a DTMF digit, or through any other signaling mechanism available to one skilled in the art (flashes, etc). This will disconnect the caller, permitting the cellular user to continue performing other telecommunication functions including, but not limited to, voicemail, calling another party, etc.

During the time that a cellular user has a connection to a caller, should the cellular user desire to move the call to another wired or wireless terminal, the cellular user can simply pickup another terminal, dial into the PCS system and, through a voice processing means, identify himself. The PCS system will interrupt the existing connection between the cellular phone and the caller to connect the caller to the new call. The cellular phone call will be disconnected.

Another mechanism for switching terminals is to simply hangup the cellular phone. The caller will be prompted for reconnect as described above. Then the subscriber can call from any other terminal to connect with the caller.

Another mechanism for switching terminals is to respond to a ringing cellular phone by pressing a code, such as a nearby extension number, to reroute the call to that extension before establishing a two-way communication.

Another mechanism for switching terminals is to utilize a conference bridge to connect the caller, the cellular user, and the new call together, permitting uninterrupted communication. At any time, the cellular telephone can be released from the conference.

A cellular user can call at any time into the PCS and request that a conference be setup. The PCS can inform subscribers and callers that a conference setup is underway using conventional wireless data tools such as pagers and cellular data terminals. The subscribers and callers can call into the PCS from off-premise wireless terminals, off-premise wired terminals, and on-premise terminals to participate in the conference.

In all of the above descriptions of cellular integration, the function of the cellular phone can be replaced with any wireless phone, including a PCS wireless phone or an on-premise wireless handset.

Tandem Switching Embodiment

One embodiment uses a tandem switch 23 to provide the features described above. Any tandem switch could be used, such as the Excel PCX512 manufactured by Excel, Inc. of Sagamore Beach Massachusetts. Tandem switch 23 carries the call either passively (without the callers knowing) or actively (with voice prompts and instructions). Tandem switch 23 can convert from one signaling protocol to another. For example, tandem switch 23 can connect primary rate lines to analog lines. This capability for protocol conversion is required to connect calls from a variety of sources.

A call will arrive on a desktop phone 12 or 13 after being directed there by the host switch, either a PBX 8 or central office switch 4 as part of a Centrex partition 5. The call will ring the physical terminals programmed for the particular directory. number dialed. Upon a ring-no-answer or busy condition, the call will be forwarded to the PCS 9 or 6 with information about who was called and optionally, who is calling. The information may be transmitted with the call or out-of-band using any standard mechanism available to those skilled in the art, including, but not limited to SMDI (SMSI), ISDN Primary Rate, ISDN Basic Rate, Proprietary Feature Phone Interface, Inband DTMF, Feature Group "D", SS7 Common Channel Signaling, etc. The call will arrive on the tandem switch 23 via one of the supported protocol interface components.

The PCS will use this information to either immediately begin the sequence of steps to connect the caller to the wireless device or to prompt the caller for information used for screening purposes. If the screening process requires voice processing elements 24, they are connected to the arriving call by the tandem switch 23. Standard voice processing elements are used, such as the Dialogic (TM) D121 Digital Signal Processor boards manufactured by Dialogic, Inc. Parsippany, N.J. Additional voice processing boards may be used for reception of facsimile or modem data calls, for example, the Dialogic (TM) Fax120 Fax Processor boards manufactured by Dialogic, Inc. Parsippany, N.J.

The voice processing elements can be used to play menus, perform voice recognition, gather DTMF digits, etc, to obtain the screening information desired.

The arriving call will be placed on hold or parked by tandem switch 23. The caller may hear ringback, music on hold, prompts, or silence, depending on the desired application set. To connect the caller to a wireless device, PCS 6, 9 will instruct tandem switch 23 to outseize a new communication path to the host switch 4, 8 respectively. If the PCS is connected to a PBX 8, then the outseize will be propagated to the central office. This outseize can be of many forms and is dependant on the signaling protocol used for connections 18, 19. The outseize will be propagated to wireless transmission source 1, 2, 7 through the central office switch 4 or PBX 8, as required. The outseize will be complete when the digits desired have been dialed or digitally communicated to the host switch and a ringing (or answer) is returned.

At this point, a communication path exists between the wireless transmission source 1, 2, 7 and the PCS 6, 9 through tandem switch 23. The communication path provides complete voice and electrical signaling to support a telephone call.

The wireless transmission source 1, 2, 7 will then begin alerting the wireless handsets 11, 14, 15 which, if in the reception area, will emit a ringing tone. If the wireless handset is answered, answer supervision will be returned from the handset to wireless transmission source 1, 2, 7. Once the answer has been returned to wireless transmission source 1, 2, 7, the communication path is allocated and the talk path between the handset 11, 14, 15 and wireless transmission source 1, 2, 7 is complete.

The wireless transmission source returns the answer supervision to central office switch 4 or PBX 8 which propagates the signal to PCS 6 or to PBX switching network 8, whichever is appropriate. If the later case, the PBX forwards this answer supervision to PCS 9.

Figure 3:
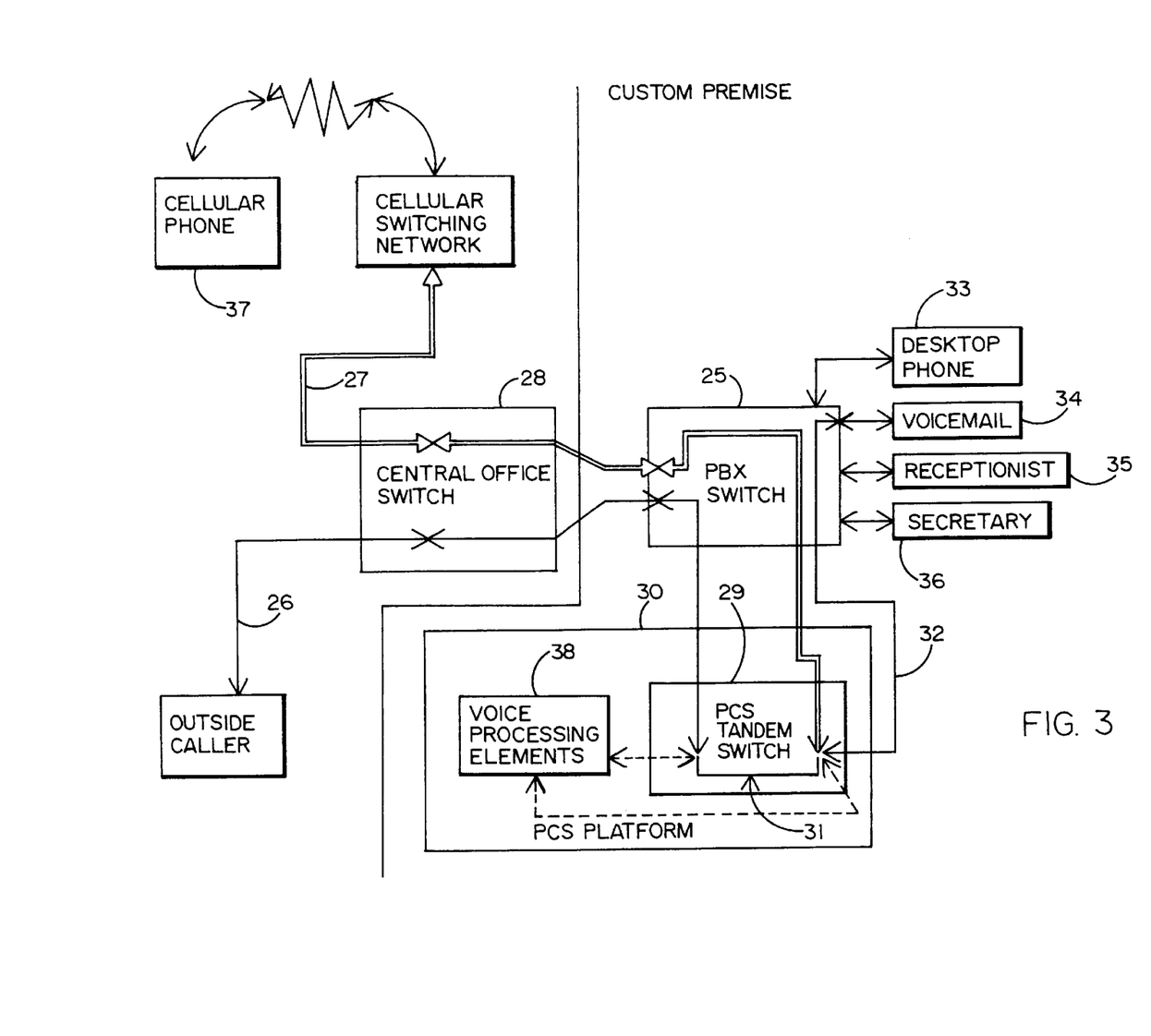
FIG. 3 illustrates a block diagram of making a connection for a cellular subscriber using one embodiment of the invention.

The PCS will optionally wait for an answer and then optionally instruct tandem switch 23 to connect voice processing elements 24 to the call to play a menu to the subscriber providing screening information as described above. The subscriber may choose to answer the call, place the call in voicemail, re-route the call to another number, etc. This choice is entered using voice processing means like DTMF key presses or voice recognition. The choice is effected by tandem switch 23 and cooperating voice processing elements 24. If the call is accepted, the tandem switch will disconnect all voice processing resources 24 and connect the caller to the subscriber. FIG. 3 shows this connected scenario utilizing a PBX.

Referring to FIG. 3, an arriving call 26 is extended through central office switch 28 to on-premise PBX or Centrex partition 25. The call may be directly routed to a desktop phone 33 or routed directly to the PCS 30 for processing. If routed to a desktop phone 33, the PCS will be placed into the coverage plan for that phone. Upon ring-no-answer or busy, the call will forward to PCS 30 and will be answered by tandem switch 29. When the call arrives, information about who is calling, and who was called is obtained through various mechanisms not shown, but obvious to those skilled in the art. Tandem switch 29 will hold the call throughout the length of the call, permitting connection and reconnection to off-premise cellular phones 37, other desktop phones 33, voicemail 34, receptionists 35, and secretary 36, or to any other dial-able address. This mechanism doesn't violate the PBX's rules about trunk-to-trunk connections, since the calls originating from tandem switch 29 appear to the PBX as new calls.

The various methods of screening are all implemented using voice processing elements 38 which are connected on demand to either the arriving caller 26, or outbound calls to cellular phone 37, desktop phones 33, voicemail 34, receptionist 35, or secretary 36. Should a data transmission to provide screening information be desired, either through some computer network, or through a wireless network, like a paging network, then the transmission is dispatched from the PCS. See U.S. Pat. No. 5,140,626, issued to Ory et al. on Aug. 18, 1992.

When inbound call 26 is connected to an outbound destination 27, 32, or any of the destinations mentioned above, a "bridge" connection is established between the two calls by tandem switch 29. Tandem switch 29 may adjust the electrical characteristics of the calls to compensate for signal loss or gain by padding the connection with the appropriate number of + or − decibels.

At this point, PBX 25 processes two separate calls, one being inbound caller 26, and the other is outbound caller 27, 32, etc, to the destination. Each call is independent with respect to the other from the viewpoint of PBX 25 and Central Office Switch 28. PCS tandem switch 29 is instructed to park the remaining call when either call disconnects. This provides the necessary call control required to embody these inventions.

While joining calls is obvious to one skilled in the art, this form of "third party" call control is believed to be unique as it relates to integrating off-premise wireless telephones to an organization's on-premise switching system. Capturing hangup on either side of a connection to perform follow-on processing to support reconnection is believed to be unique. Interrupting a connection in place to preemptively change the nature of the communication controllable through a voice processing means is also unique. Thus, stealing a caller from a receptionist or voicemail from an off-premise or on-premise telephone terminal is unique. Eavesdropping on existing connections in place as a means of screening callers leaving messages from off-premise or on-premise terminals is unique.

Advanced Intelligent Network Embodiment

A second embodiment contains some additional capabilities which will optimize the trunk utilization of the processes described in the tandem switching embodiment. A tandem switch is still required to connect the various voice processing means and to interface to the telecommunications network.

The additional element, an SS7 processor, provides several improvements to the art described with just a tandem switch. The SS7 processor can provide information about arriving calls, including called party and calling party, and other useful information. Calls can be redirected without answering, providing a mechanism for ringing cellular telephones without tieing up two trunks.

Triggers can be set to provide call control when certain numbers are dialed and when hangup's are detected. These triggers are registered with the Service Switching Point SSP and information and call control are returned when these "triggers" happen.

Figure 4:
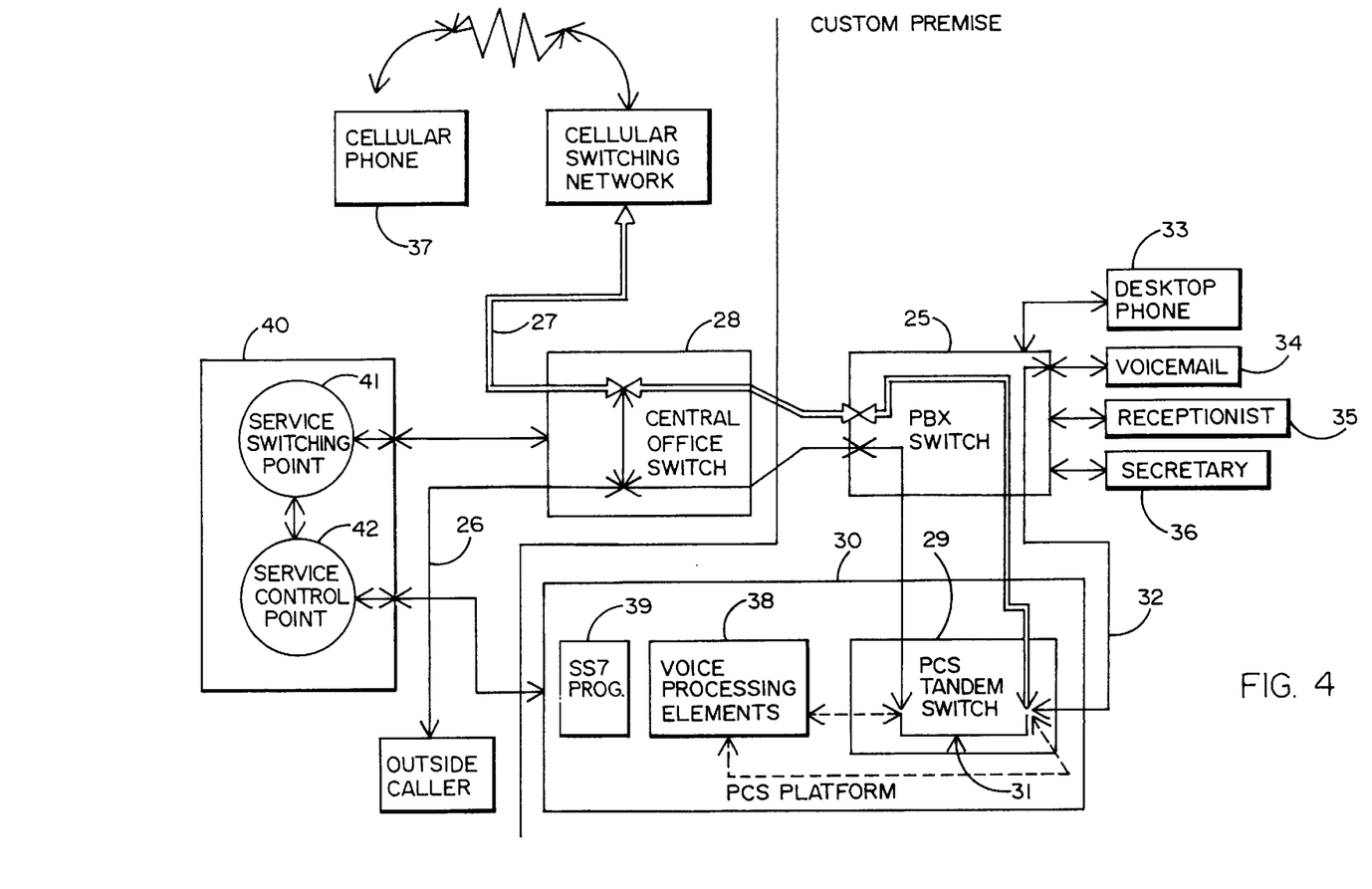
FIG. 4 illustrates a block diagram of making a connection for a cellular subscriber using a second embodiment of the invention including an Advanced Intelligent Network.

Referring to FIG. 4, SS7 network 40, including Service Switching Point 41 and Service Control Point 42, connects to PCS platform 30 through SS7 processor 39 and to central office switch 28. Any SS7 processor could be used, such as one manufactured by EBS of Connecticut. When a call is to be routed from off-premise to off-premise, the SS7 network can be used to perform either a "release-link" operation or to join the calls.

Triggers may be registered with the SS7 network to gain control of the call once a hangup has occurred on either end of a call.

Configurations Supported

The above detailed description was for an outside caller, calling an organization's telephone system and being re-routed to a cellular telephone. While there are other "one-number" services, none exist today that can provide the functionality from the customer's site, initiated by the customers switching system.

Other combinations could include the following general combinations, wireless to inside phone, inside phone to wireless, and wireless to wireless. More specifically, options include calls from:

inside to outside cellular outside cellular to inside outside cellular to outside cellular outside caller to outside PCS handset inside caller to outside PCS handset outside PCS handset to inside outside PCS handset to outside PCS handset outside caller to PBX based wireless handset

PBX based wireless handset to outside caller

Figure 5:
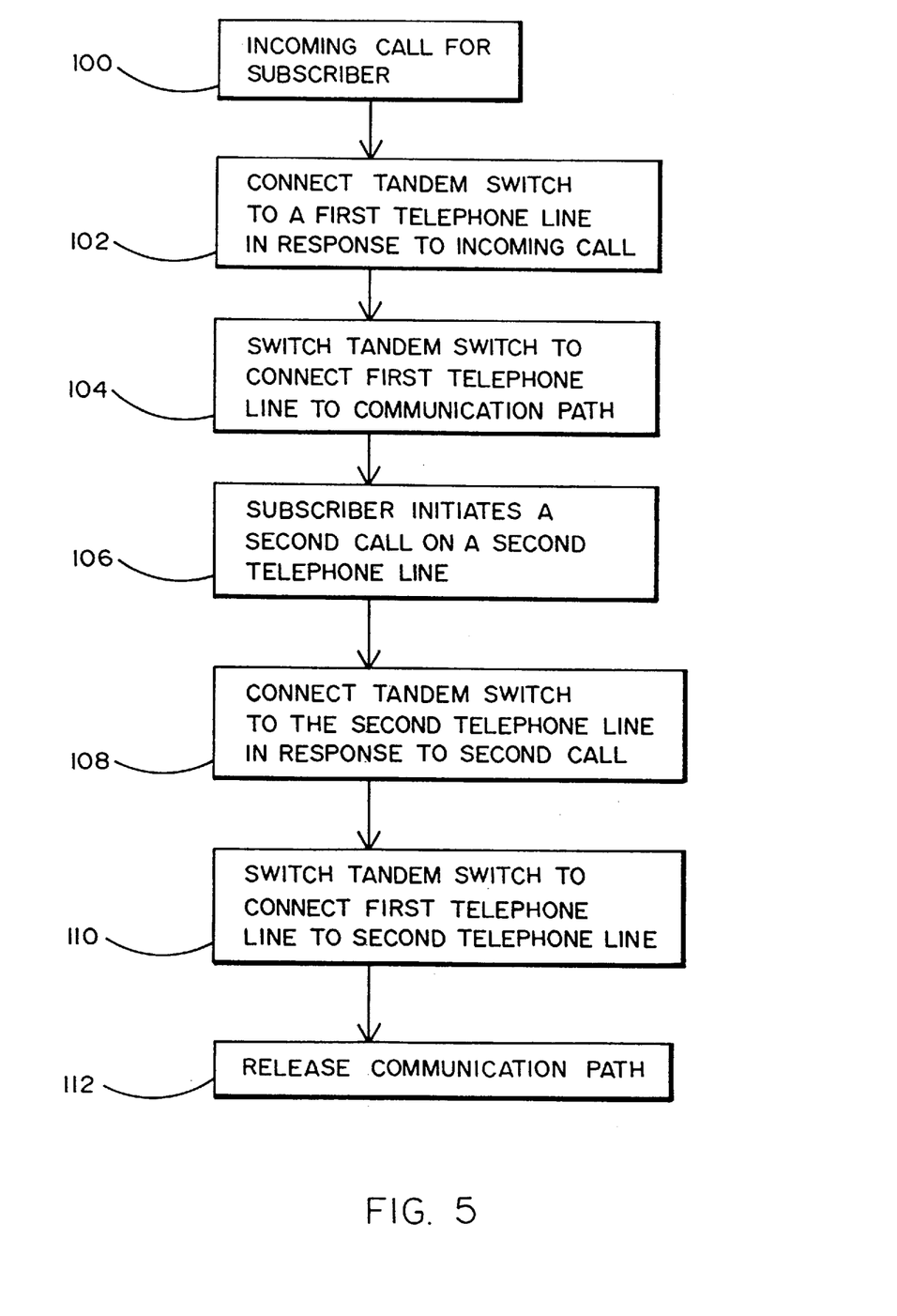
FIG. 5 is general flowchart of a call hand-off procedure.

PBX based wireless handset to PBX based wireless handset Cell Saver Referring to FIG. 5, one advantageous method of handing a call off from a wireless terminal to a wired terminal according to the present invention is illustrated. The method begins with the step 100 of initiating a first telephone call from a first party (the caller) at a first telephone terminal to a second party (the subscriber) at a wireless telephone terminal 11, 14, or 15 via a first telephone line. Next, at step 102, the tandem switch 23 or 29 is connected to the first telephone line in response to the first telephone call. At step 104 the tandem switch 23 or 29 is switched to connect the first telephone line to a communication path interconnecting the tandem switch 23 or 29 and the wireless terminal 11, 14, or 15 to establish a first telephone connection between the first and second parties. Afterwards, the second party, at step 106, initiates a second telephone call at a second telephone terminal 12 or 13 connected to a second telephone line. Next, at step 108, the tandem switch 23 or 29 is connected to the second telephone line in response to the second telephone call. The second party then, at step 110, activates the tandem switch 23 or 29 to complete a second telephone connection by switching the tandem switch 23 or 29 to connect the first telephone line to the second telephone line, thereby establishing the second telephone connection between the first and second parties. The tandem switch 23 or 29 is activated in response to signals generated by the second party via the wireless telephone terminal 1 1, 14, or 1 5 or the second telephone terminal 12 or 13. Finally, at step 112, the tandem switch releases the communication path after the second telephone connection has been established.

Figure 6:
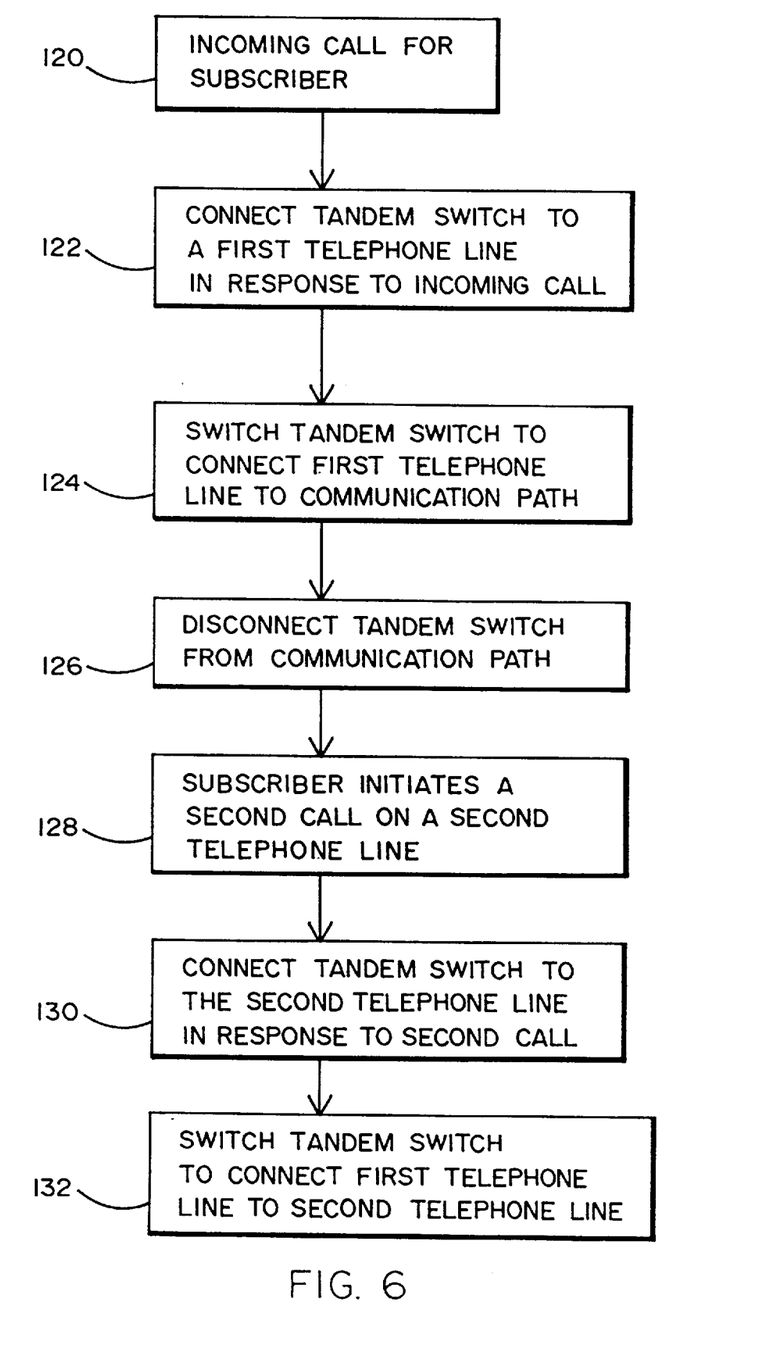
FIG. 6 is a general flowchart of an alternative call hand-off procedure.

Referring to FIG. 6, another advantageous method of handing a call off from a wireless terminal to a wired terminal according to the present invention is illustrated. The method begins with the step 120 of initiating a first telephone call from a first party (the caller) at a first telephone terminal to a second party (the subscriber) at a wireless telephone terminal 11, 14, or 15 via a first telephone line. Next, at step 122, the tandem switch 23 or 29 is connected to the first telephone line in response to the first telephone call. At step 124 the tandem switch 23 or 29 is switched to connect the first telephone line to a communication path interconnecting the tandem switch 23 or 29 and the wireless terminal 11, 14, or 15 to establish a first telephone connection between the first and second parties. Afterwards, at step 126, the tandem switch 23 or 29 is disconnected from the communication path. Next, the second party, at step 128, initiates a second telephone call at a second telephone terminal 12 or 13 connected to a second telephone line. Then, at step 130, the tandem switch 23 or 29 is connected to the second telephone line in response to the second telephone call. The second party then, at step 132, activates the tandem switch 23 or 29 to complete a second telephone connection by switching the tandem switch 23 or 29 to connect the first telephone line to the second telephone line, thereby establishing the second telephone connection between the first and second parties. The tandem switch 23 or 29 is activated in response to signals generated by the second party via the second telephone terminal 12 or 13.

Figure 7:
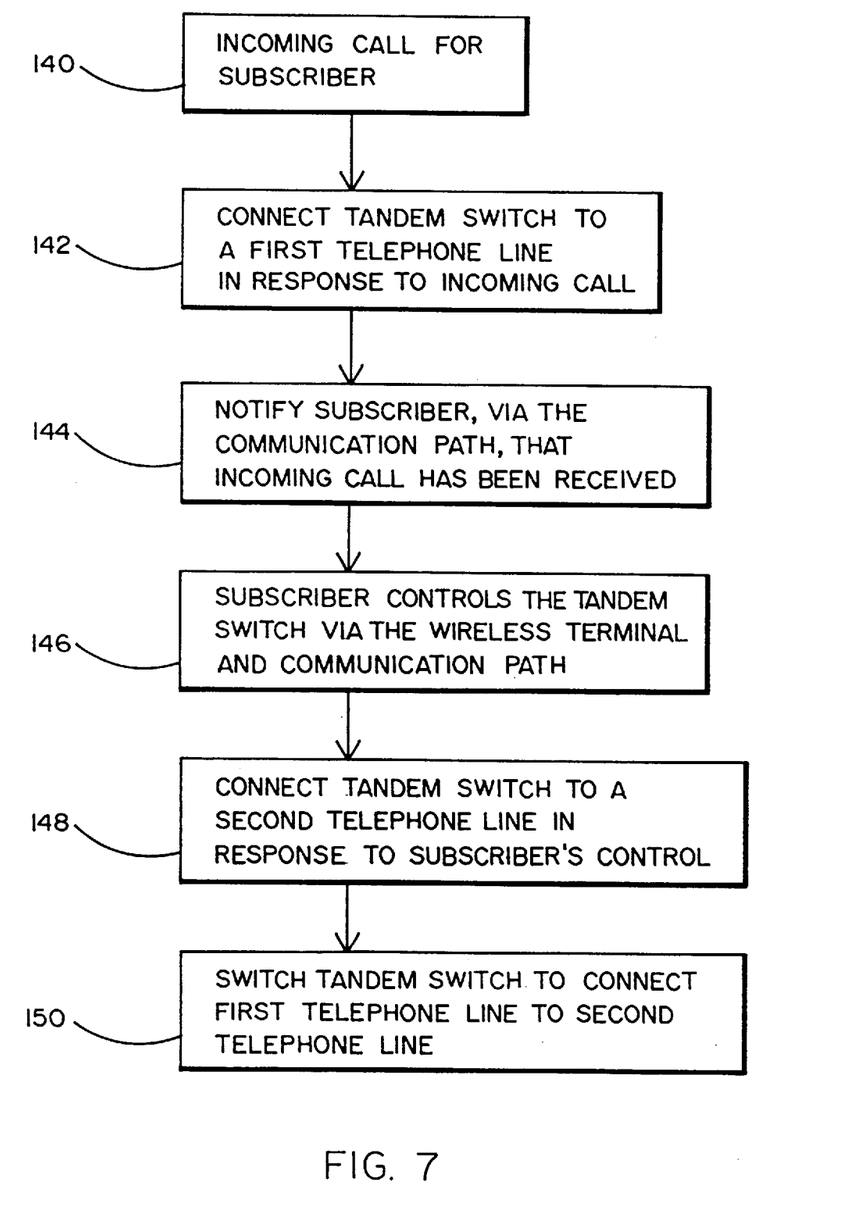
FIG. 7 is a general flowchart of an alternative call hand-off procedure.

Referring to FIG. 7, still another advantageous method of handing a call off from a wireless terminal to a wired terminal according to the present invention is illustrated. The method begins with the step 140 of initiating a first telephone call from a first party (the caller) at a first telephone terminal to a second party (the subscriber) at a wireless telephone terminal 11, 14, or 15 via a first telephone line. Next, at step 142, the tandem switch 23 or 29 is connected to the first telephone line in response to the first telephone call. At step 144 the second party is notified at the wireless terminal 11, 14, or 15, via a communication path interconnecting the wireless terminal 11, 14, or 15 and the tandem switch 23 or 29, that the first call has been received. Afterwards, the second party, at step 146, controls the tandem switch 23 or 29 via the wireless terminal 11, 14, or 15 to establish a connection between the tandem switch 23 or 29 and a second telephone terminal 12 or 13 via a second telephone line. Next, at step 148, the tandem switch 23 or 29 is connected to the second telephone line in response to the controlling step 146. The second party then, at step 150, activates the tandem switch 23 or 29 to complete a first telephone connection by switching the tandem switch 23 or 29 to connect the first telephone line to the second telephone line, thereby establishing the first telephone connection between the first and second parties.

A general description of the device and method of using the present invention as well as a preferred embodiment of the present invention, have been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A method of enabling a party to change telephone terminals during a call, said method comprising the steps of:

initiating a first telephone call from a first party at a first telephone terminal to a second party at a wireless telephone terminal via a first telephone line;

providing a tandem switch and connecting said tandem switch to said first telephone line in response to said first telephone call;

switching said tandem switch to connect said first telephone line to a communication path interconnecting said tandem switch and said wireless terminal, thereby establishing a first telephone connection between said first and second parties at said first and wireless telephone terminals;

initiating a second telephone call from said second party at a second telephone terminal connected to a second telephone line;

connecting said tandem switch to said second telephone line connected to said second telephone terminal in response to said second telephone call;

switching said tandem switch, in response to a signal from either of said wireless and second telephone terminals, to connect said first telephone line to said second telephone line, thereby establishing a second telephone connection between said first and second telephone terminals; and disconnecting said communication path from said tandem switch.

2. The method of claim 1 wherein said wireless telephone terminal is at a location remote from said tandem switch.

3. The method of claim 1, wherein said wireless and second telephone terminals are at a location remote from said tandem switch.

4. The method of claim 1 wherein said second telephone terminal is at a location remote from said tandem switch.

5. The method of claim 1 wherein said wireless and second telephone terminals are at the same location.

6. A method of enabling a party to change telephone terminals during a call, said method comprising the steps of:

initiating a first telephone call from a first telephone terminal to a party at a wireless telephone terminal via a first telephone line;

providing a tandem switch and connecting said tandem switch to said first telephone line in response to said first telephone call;

switching said tandem switch to connect said first telephone line to a communication path interconnecting said tandem switch and said wireless terminal, thereby establishing a first telephone connection between said first and wireless telephone terminals;

disconnecting said tandem switch from said communication path while maintaining said connection between said tandem switch and said first telephone line;

initiating a second telephone call from said party at a second telephone terminal to said first telephone terminal via a second telephone line;

connecting said tandem switch to said second telephone line connected to said second telephone terminal in response to said second telephone call; and switching said tandem switch, in response to a signal from either of said second and wireless telephone terminals, to connect said first telephone line to said second telephone line, thereby establishing a second telephone connection between said first and second telephone terminals.

7. The method of claim 6 wherein said wireless telephone terminal is at a location remote from said tandem switch.

8. The method of claim 6 wherein said second and wireless telephone terminals are at a location remote from said tandem switch.

9. The method of claim 6 wherein said second telephone terminal is at a location remote from said tandem switch.

10. The method of claim 6 wherein said wireless and second telephone terminals are at the same location.

11. A system for enabling a party to change telephone terminals during a call, said system comprising:

means for initiating a first telephone call from a first party at a first telephone terminal to a second party at a wireless telephone terminal via a first telephone line;

a tandem switch and means for connecting said tandem switch to said first telephone line in response to said first telephone call;

means for switching said tandem switch to connect said first telephone line to a communication path interconnecting said tandem switch and said wireless terminal, thereby establishing a first telephone connection between said first and second parties at said first and wireless telephone terminals;

means for initiating a second telephone call from said second party at a second telephone terminal connected to a second telephone line;

means for connecting said tandem switch to said second telephone line connected to said second telephone terminal in response to said second telephone call;

means for switching said tandem switch, in response to a signal from either of said wireless and second telephone terminals, to connect said first telephone line to said second telephone line, thereby establishing a second telephone connection between said first and second telephone terminals; and means for disconnecting said communication path from said tandem switch.

12. The system of claim 11 wherein said wireless telephone terminal is at a location remote from said tandem switch.

13. The system of claim 11, wherein said wireless and second telephone terminals are at a location remote from said tandem switch.

14. The system of claim 11 wherein said second telephone terminal is at a location remote from said tandem switch.

15. The system of claim 11 wherein said wireless and second telephone terminals are at the same location.

16. A system for enabling a party to change telephone terminals during a call, said system comprising:

means for initiating a first telephone call from a first telephone terminal to a party at a wireless telephone terminal via a first telephone line;

a tandem switch and means for connecting said tandem switch to said first telephone line in response to said first telephone call;

means for switching said tandem switch to connect said first telephone line to a communication path interconnecting said tandem switch and said wireless terminal, thereby establishing a first telephone connection between said first and wireless telephone terminals;

means for disconnecting said tandem switch from said communication path while maintaining said connection between said tandem switch and said first telephone line;

means for initiating a second telephone call from said party at a second telephone terminal to said first telephone terminal via a second telephone line;

means for connecting said tandem switch to said second telephone line connected to said second telephone terminal in response to said second telephone call; and means for switching said tandem switch, in response to a signal from either of said second and wireless telephone terminals, to connect said first telephone line to said second telephone line, thereby establishing a second telephone connection between said first and second telephone terminals.

17. The system of claim 16 wherein said wireless telephone terminal is at a location remote from said tandem switch.

18. The system of claim 16 wherein said second and wireless telephone terminals are at a location remote from said tandem switch.

19. The system of claim 16 wherein said second telephone terminal is at a location remote from said tandem switch.

20. The system of claim 16 wherein said wireless and second telephone terminals are at the same location.

* * * * *